United States Patent [19] [11] 4,425,857
Lienemann et al. [45] Jan. 17, 1984

[54] LOCK-UP MECHANISM FOR A PLANTER ROW UNIT

[75] Inventors: Darlo E. Lienemann, Darien; Donald L. Ledermann; Nicholas H. Wunschl, both of Bolingbrook, all of Ill.

[73] Assignee: International Harvester Co., Chicago, Ill.

[21] Appl. No.: 358,069

[22] Filed: Mar. 15, 1982

[51] Int. Cl.³ .............................................. A01C 5/00
[52] U.S. Cl. ...................................... 111/85; 111/69; 111/68; 111/67; 111/52; 111/66
[58] Field of Search ....................... 111/85, 69, 68, 67, 111/66, 52, 61, 1, DIG. 1; 172/307, 417, 484, 466, 464, 471, 481, 624, 624.5, 661, 662, 674, 683, 739

[56] References Cited

U.S. PATENT DOCUMENTS 3,124,201 3/1964 Downing et al. ................... 172/307
4,241,674 12/1980 Mellinger .............................. 111/52
4,248,310 2/1981 McWilliams ....................... 172/661

OTHER PUBLICATIONS

White Farm Equipment Co.-The 51005 Soybean Special Seed Boss; date 1/18/82.
White Farm Equipment Co. 5100/51005/5100/5700 Seed Boss Planters; date Jun. 12, 1983.

Primary Examiner—Robert A. Hafer
Assistant Examiner—Bradley M. Lewis
Attorney, Agent, or Firm—Dennis K. Sullivan; F. David AuBuchon

[57] ABSTRACT

A row unit with a mechanism which provides normal planting via a parallel bar linkage connection to the planter and which can be locked up in a raised, non-planting position when desired. The mechanism includes curved slotted openings in the lower bars of the linkage for frame mounted spacers as the frame pivots about the connection with the upper bars, and locking structure having detents to engage the spacers in the lowered working and raised non-working positions. The mechanism also prevents the release of the locking structure until the row unit weight is lifted therefrom.

11 Claims, 5 Drawing Figures

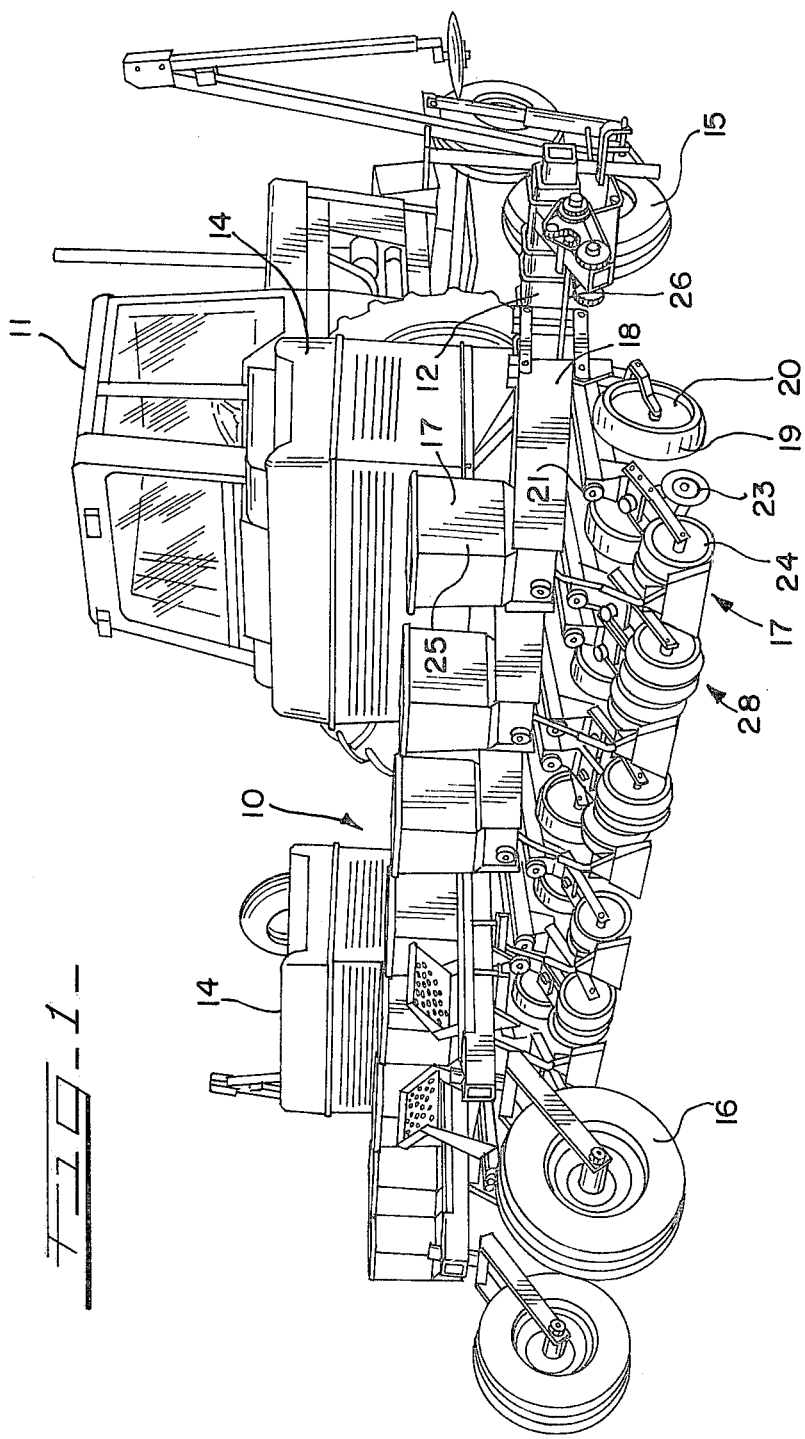

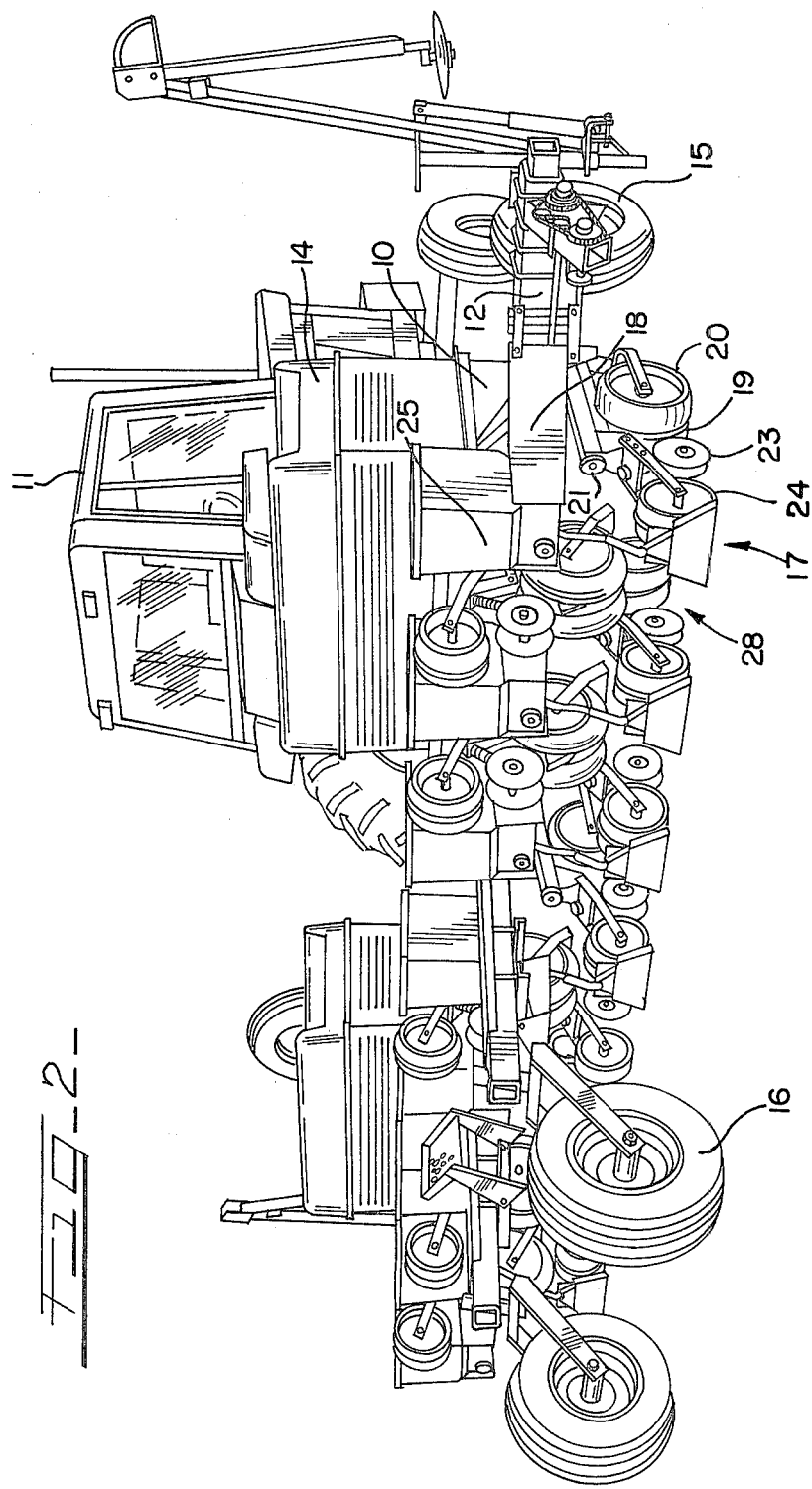

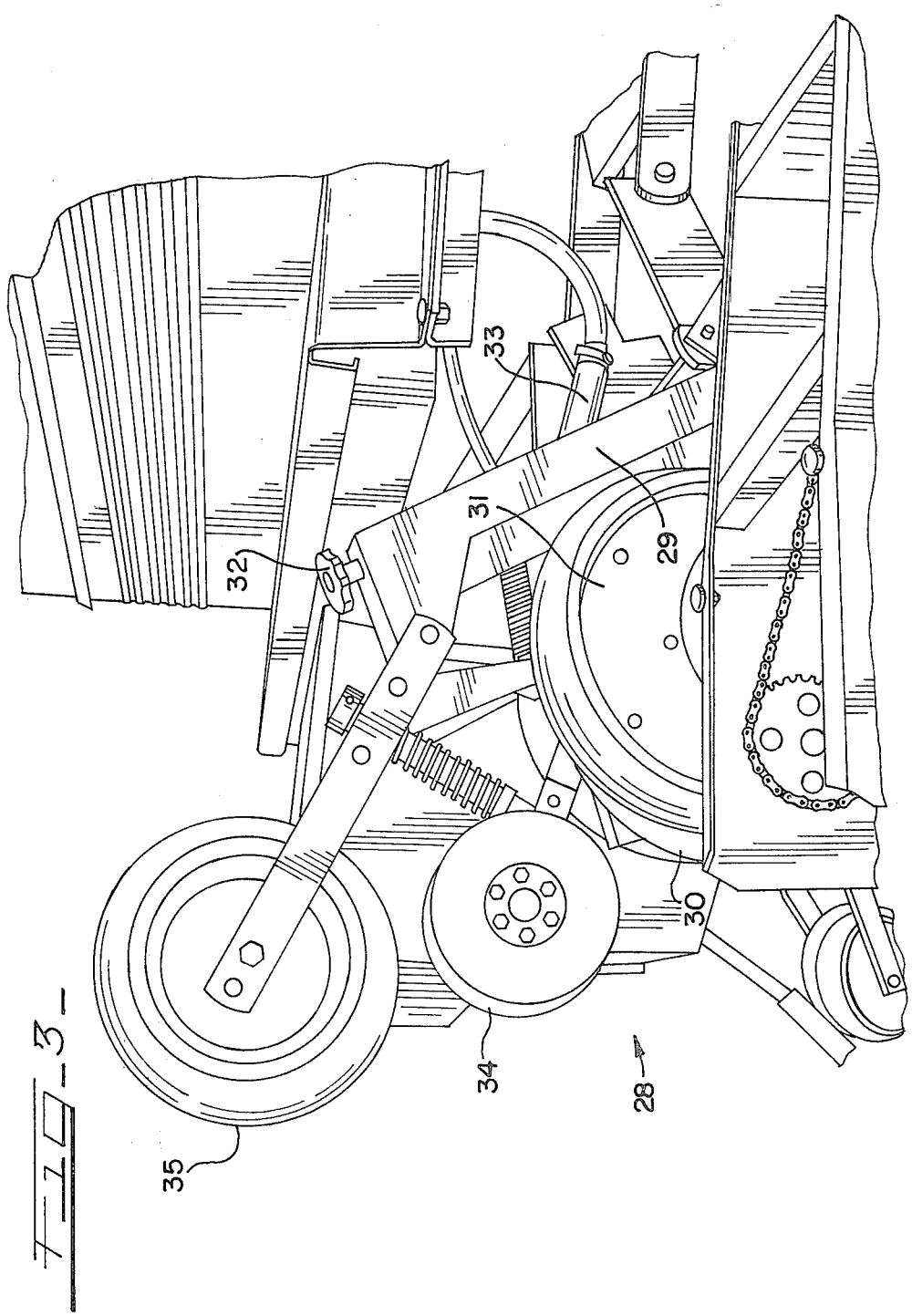

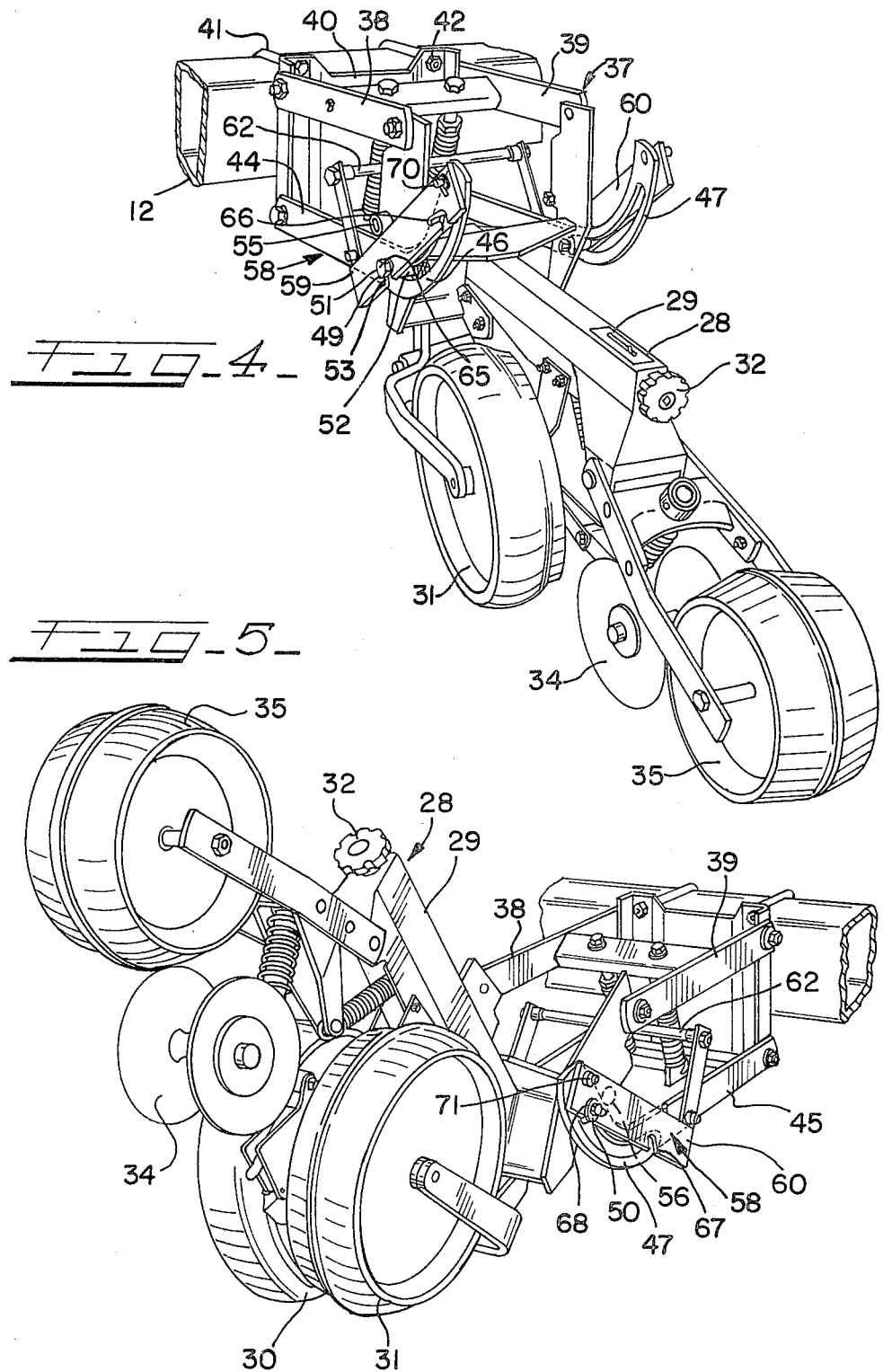

LOCK-UP MECHANISM FOR A PLANTER ROW UNIT

FIELD OF THE INVENTION

This invention pertains generally to a row unit movable between a working or a non-working position.

DESCRIPTION OF THE PRIOR ART

A conventional planter may utilize a plurality of laterally spaced row units generally mounted on a transversely extending member. Each row unit is usually mounted to the member by a parallel bar linkage so that the unit can follow the ground contour. If for corn, the row units may be spaced apart to provide 30, 36, and 38 inch rows. Soy beans are planted in narrower rows which may be 15, 18, or 19 inches or less. Thus, to use the same planter for both crops requires the installation of a row unit between each unit for corn and then planting soy beans by all units to produce 15, 18, and 19 inch rows. For corn, these interspaced units must be disassembled from the member to again achieve the desired 30, 36, or 38 inch rows. The assembly and disassembly of the relatively heavy interspaced units takes an undue amount of time and effort.

SUMMARY OF THE INVENTION

Applicants, as a consequence, designed a mechanism for each interspaced row unit that is utilized only for soy beans, or the like, that allows same to be raised and locked in the raised position when corn, or the like, is to be planted by the rest of the units. Also the mechanism equipped row unit still provides the parallel bar linkage desired in the working position.

Specifically, applicants have provided a mechanism having a curved cam slot in each spaced lower bar of the parallel bar linkage, an element attached to the unit frame and movable in the slot, and a lock arm having notches or detents pivotally mounted to each lower bar and connected to each other to lock each element in the working or non-working position in the slot. Each lock arm has an upper elongated notch which traps the element in the raised position even when the quick attachment pin which connects each lock arm to the associated lower bar in the working or non-working position is removed. Thus, the lock arms cannot be disengaged from the elements after removal of the pins until the row unit is lifted (preferably by a hoist) out of the lock arm notches—which structure prevents accidental dropping of the unit. With the lock arms lifted via a handle or the like and the elements released, the row unit can then be lowered to the working position at the other end of the bar slots. The quick attachment pins are again installed after the lock arm is again pivoted into the lock position with a lower notch engaging the element. A cam roller mounted on the frame and adjacent each lower bar serves as a down stop for the row unit and also remains in contact with each bar between the working and non-working position during which the row unit pivots about the connection with upper bars of the parallel bar linkage. Inasmuch as the row unit has an air seed delivery system, no gear linkage connection is needed as for driving a plate of a plate type planter. Also, no granular hopper and meter drive mechanism connection is needed in a soy bean application.

In view of the above remarks, it is clear that applicants' mechanism allows one planter to be utilized for planting different crops having different row spacing with a minimum of set up time. Preferably, the row units are staggered longitudinally of the planter with the interspaced units being rearward to allow for the easy passage of trash between the narrowly spaced units.

Also, although eight row units and five interspaced units are shown for a total of thirteen (because of the two assist wheels), rather than fifteen it is to be understood that raised assist wheel structures could be provided to achieve seven interspaced units to get fifteen equally spaced rows. The assist wheel spaces allow the later cultivation of the crop if desired.

BRIEF DESCRIPTION OF THE DRAWINGS

FIG. 1 is a rear, right side perspective view of an air planter showing the interspaced and the standard row units in the working position;

FIG. 2 is a rear right, side perspective view of the planter with the interspaced units in the raised, locked position and the standard units in the working position;

FIG. 3 is an enlarged right, rear perspective view of a interspaced row unit in the raised, locked position;

FIG. 4 is an enlarged left, rear perspective view showing an interspaced unit in a down, working position and the lock up mechanism; and FIG. 5 is an enlarged right, rear perspective view showing the interspaced unit of FIG. 4 in the non-working, raised and locked position with the mechanism engaged.

DESCRIPTION OF THE PREFERRED EMBODIMENT

Referring to FIGS. 1, 2 and 3, 10 indicates a planter equipped to be drawn by tractor 11 via suitable structure (not shown). Planter 10 has a transversely extending (to the direction of travel) member or tool bar 12 which serves as a support for the various planter components. Planter 10 is an air type planter and has dual seed hoppers 14 on the front of which are mounted air pressurized revolving seed drums (not shown) which direct air delivered seed to the individual row units. The particular drum arrangement is substantially similar to that disclosed in U.S. Pat. No. 3,762,603 issued Oct. 2, 1973 for Seed Dispenser For Planters. Front 15 and rear 16 assist wheels provide support for the planter 10.

Two types of row units are mounted on tool bar 12 of planter 10. Row units 17 are normally used for planting corn and are spaced at preferably 30, 36, and 38 inch intervals on bar 12. There are eight row units 17. Each unit 17 has a frame 18 that is conventionally connected to bar 12 by a parallel bar linkage so that each unit can follow the ground contour independently of the other units. Each unit 17 also has furrow opening disks 19, gauge wheels 20, gauge wheel adjustment mechanism 21, seed tube (not shown) closing disks 23, and press wheel 24. Also mounted on the rear end of frame 18 is granular chemical hopper 25 having a dispenser shaft driven by a chain drive from shaft 26 rotated from a front assist wheel. Thus, row unit 17 has all of the conventional equipment needed to plant corn. Also to be noted is that assist wheels 16 are spaced between the third and fourth row units 17 from the left of the planter and the fifth and sixth row units 17.

Located midway between row units 17 (thus at 15, 18, or 19 inch intervals) are row units 28. Only at the location of the assist wheels 16 are row units 28 missing. This unplanted space is reserved for the wheels of a cultivator is desired. Of course, if desired the assist wheel support structure could be modified for row units, to provide 15 units, but only five row units 28 are here utilized. Row unit 28 would only be used to plant soybeans, for example. Consequently, no granular hopper or the like, as shown with row unit 17, is utilized. Also, therefore, no hopper drive connection is needed. Row units 28 are preferably staggered rearwardly from units 17 to provide for the easy passage of trash between the closely spaced units.

In the working or planting position of FIG. 1, row units 17 and 28 would plant 13 rows of soybeans. The granular hopper of row units 17 would be left empty. Soybean drums would be used on the planter.

If only the planting of corn at 30, 36, or 38 inch spacings were desired, the five row units 28 would be lifted, preferably by block and tackle due to their substantial weight, and locked in the non-working or planting positions shown in FIG. 2. An individual row unit 28 is shown to an enlarged scale in FIG. 3. Each row unit 28 is generally similar to row unit 17 except for the lock up mechanism and the lack of a granular hopper. Specifically, row unit 28 (see also FIGS. 4 and 5) includes frame 29, furrow opening disks 30, gauge wheels 31, gauge wheel mechanism 32, seed tube or dispenser 33, closing disks 34 and press wheel 35.

Row unit 28 has a modified parallel bar linkage 37 from that of row unit 17 for connection to tool bar 12. Linkage 37 has spaced upper bars 38 and 39 which are the same as the comparable upper bars for unit 17 except somewhat longer. Bars 38 and 39 are pivotally connected at their forward ends to bracket 40 which in turn is attached to tool bar 12 by U-bolts 41 and nuts 42. Bars 38 and 39 are also pivotally connected at their rearward ends to frame 29. Lower bars 44 and 45 are pivotally connected at their forward ends to bracket 40. Lower bars 44 and 45 also have curved slotted openings 46 and 47 which extend rearward from the pivotal connection of bars 38 and 39 to frame 29. The slotted openings are located on a radius about the pivotal connection of the frame 29 to the rearward end of upper bars 38 and 39 to allow the frame 29 and thus row unit 28 to pivot thereabout to the non-working position while still utilizing the linkage 37 in the normal lowered working position. Supporting frame 29 and thus the unit 28 in the slotted openings are spacers 49 and 50. Pin means or spacer 49 consists of bolt 51, sleeve 52, and nut 53 along with a suitable washer, and is rigidly attached to frame 29 on one side thereof and projecting therefrom for movement in the slotted opening 46. Spacer 50 is similarly constructed and moves in opening 47. Also mounted for rotation on opposing lateral sides of frame 29 are rollers 55 and 56. The frame 29, where the rollers are attached, serves as a bar of the linkage 37 and hence the contact of a roller 55 with bar 44 and roller 56 with bar 45 provides a down stop for the frame 29 on the linkage 37. The rollers remain in contact with the bars in movement between the lowered and raised positions thus fixing the location of the pivot of the frame with the upper bars 38 and 39.

To maintain the unit 28 in the lowered or raised position, applicants have provided a locking means 58 for locking each spacer 49 and 50 in the corresponding position in slotted openings 46 and 47. Specifically, locking means 58 includes spaced arms 59 and 60. Each arm has lever structure whereby arm 59 is pivotally attached to lower bar 44 and arm 60 to lower bar 45. Connecting the lever structure for unitary movement of means 58 is rod 62 which may be used as a handle for manual actuation of means 58. Arm 59 has detents or notches 65 and 66 for spacer 49. Arm 60 has detents or notches 67 and 68 for spacer 50. Notches 65 and 67 are of substantially normal configuration and trap spacers 49 and 50 in the forward position of slotted openings 46 and 47 when unit 28 is in the lowered working position. To insure that the row unit remains in this position, especially when obstacles are encountered, applicants provide quick attachment pin or fastening means 70 that extends between openings in lower bar 44 and arm 59 and pin 71 comparably connected between arm 60 and bar 45. As is apparent from FIG. 4, row unit 28 is securely connected to the linkage 37 to function in the usual manner of following the ground contour in the lowered working position. Also, it is apparent from FIG. 5, that row unit 28 is securely fixed in its locked up and non-working position due to the location of spacers 49 and 50 in notches 66 and 68 of arms 59 and 60. The quick attachment pins aid in preventing the accidental movement of the unit from the locking means 58.

Notches 66 and 68 do not have the configuration of notches 65 and 67, but instead are elongated in the direction of linkage 37. This structure is provided to prevent the unlocking of the locking means 58 when the unit weight is on same and the dropping of the unit. No comparable configuration is required in slotted openings 46 and 47 since the associated bars 44 and 45 can move upwardly in regard to rollers 55 and 56 but not downwardly.

In operation of the mechanism, the sequence detailed below must be followed. To move from the lowered operating position of FIG. 4 to the raised, non-working position of FIG. 5, the row units would normally be first raised slightly from the ground by elevation of the planter tool bar. A block and tackle would then be preferably attached to unit 28. The quick attachment pins 70 and 71 are then removed, and locking means 58 rotated forwardly via rod 62 to free spacers 59 and 60. The unit 28 then is lifted via the hoist and pivoted about the pivotal connection of upper bars 38 and 39 to frame 29 until the ends of slotted opening 46 and 47 are encountered by spacers 49 and 50. The locking means 58 is rotated downwardly and notches 66 and 68 capture spacers 49 and 50. The unit 28 is lowered further to move the spacers into the elongated portion of notches 66 and 68 with the spacers remaining in the ends of slots 46 and 47 as the lower bars 44 and 45 pivot upward. The quick attachment pins 70 and 71 are installed to securely maintain unit 28 in the non-working position of FIG. 5. Corn could then be planted in 30, 36, and 38 inch rows by the standard units 17.

To lower the unit 28 to the working position for planting soybeans or the like, with the other down units 17, a hoist is first attached to unit 28. The quick attachment pins 70 and 71 are removed and the unit lifted from the elongated portion of notches 66 and 68 of locking means 58. The locking means 58 can now be rotated out of the locking position on spacers 49 and 50 via rod 62 and the unit 28 lowered via the hoist to the working position with spacers 49 and 50 again at the forward end of slotted openings 46 and 47. Locking means 58 is then rotated until notches 65 and 67 capture spacers 49 and 50. The quick attachment pins 70 and 71 are again utilized to secure the locking means 58 to lower bars 44 and 45.

As is readily apparent, unit 28 can be used in a planting operation with a parallel bar linkage or locked up in a raised, non-planting operation by the lock up mechanism combined with the linkage.

What is claimed is:

1. A planter row unit comprising:

a parallel bar linkage, said linkage being adapted for attachment to a planter, said linkage including dual spaced upper and lower bars, said lower bars having curved slotted openings;

a row unit frame having furrow forming means, furrow closing means, and seed dispensing means, said upper bars being pivotally connected to said frame, pin means mounted on said frame and moveable in said slotted openings in said lower bars between a lowered unit working position and a raised non-working position;

locking means pivotally mounted on said lower bars, said locking means having detents for locking the frame pin means in lowered working and raised non-working positions, said detents being notches elongated in the direction of said linkage and preventing disengagement of said locking means until said frame member is lifted therefrom before subsequent lowering to the working position; and downstop means for the frame in the working position, said down stop means comprising a pair of spaced rollers mounted on said frame, with each roller engaging a lower bar.

2. The unit of claim 1 in which said rollers engage said bars in the movement between said lowered working and raised non-working positions.

3. The unit of claim 2 in which said locking means comprises a locking arm for each bar, and a rod connecting said arms for simultaneous movement and further comprising furrow depth gauging means.

4. A planter row unit adapted for connection to a mobile frame comprising:

a four bar linkage including an upper bar and a lower bar having forward ends adapted for pivotal attachment to said mobile frame, the rearward portion of said lower bar having an arcuate slot therein;

a planter row unit frame carrying furrow forming means, furrow closing means, and seed delivery means, said row unit frame being pivotally connected to said upper bar and having pin means disposed thereon engaging said arcuate slot and moveable therein from the forward end of said slot toward the rearward end upon said row unit frame being raised from a working position to a non-working position; and means for securing said row unit frame in both the working position and the non-working position.

5. The unit of claim 4 further comprising fastening means for connecting and maintaining said locking means to said lower bars in the selected positions.

6. The unit of claim 4 in which said detents for holding said frame in the raised non-working position are elongated notches, said notches preventing disengagement of said locking means until said frame member is lifted therefrom before subsequent lowering to the working position.

7. The unit of claim 6 in which said notches are elongated in the direction of said linkage and further comprising down stop means for the frame in the working position.

8. The unit of claim 5 in which said fastening means are quick attachment pins with each pin extending between said locking means and a lower bar.

9. The invention in accordance with claim 4 wherein said means securing said row unit frame in the working and non-working positions comprises means for fixing the position of said pin means adjacent each end of said arcuate slot.

10. The invention in accordance with claim 4 and the effective length of said lower bars defined by the location of said pin means in said slot being substantially the same as the effective length of said upper bars when said planter row unit is in the working position thereby forming a parallel bar linkage.

11. The invention in accordance with claim 4 and said means for securing comprising locking means pivotally mounted on said lower bars, said locking means having detents for locking the row unit frame pin means in lowered working and raised non-working positions.

* * * * *